US007587029B2

(12) United States Patent
Pepper et al.

(10) Patent No.: US 7,587,029 B2
(45) Date of Patent: Sep. 8, 2009

(54) TEST DEVICE FOR DATA SERVICES

(75) Inventors: Adrian R Pepper, Derby (GB); Jonathan C. J Rich, Purley (GB)

(73) Assignee: British Telecommunications PLC, London (GB)

( * ) Notice: Subject to any disclaimer, the term of this patent is extended or adjusted under 35 U.S.C. 154(b) by 311 days.

(21) Appl. No.: 10/564,782

(22) PCT Filed: Jul. 16, 2004

(86) PCT No.: PCT/GB2004/003114

§ 371 (c)(1),
(2), (4) Date: Jan. 17, 2006

(87) PCT Pub. No.: WO2005/013592

PCT Pub. Date: Feb. 10, 2005

(65) Prior Publication Data

US 2006/0176841 A1 Aug. 10, 2006

(30) Foreign Application Priority Data

Jul. 18, 2003 (GB) .................................. 0316891.1

(51) Int. Cl.
*H04M 1/24* (2006.01)
*H04M 3/08* (2006.01)
*H04M 3/22* (2006.01)

(52) U.S. Cl. ..................... 379/21; 379/1.03; 379/27.04; 379/29.02

(58) Field of Classification Search ................ 379/1.01, 379/1.03, 1.04, 21, 22.01, 22.02, 22.04, 24, 379/29.01, 29.02, 27.04
See application file for complete search history.

(56) References Cited

U.S. PATENT DOCUMENTS 5,128,619 A * 7/1992 Bjork et al. ................. 324/533

(Continued)

FOREIGN PATENT DOCUMENTS

EP 1005209 A2 5/2000

(Continued)

OTHER PUBLICATIONS

PCT Written Opinion.

(Continued)

*Primary Examiner*—Binh K Tieu
(74) *Attorney, Agent, or Firm*—Nixon & Vanderhye PC (57) ABSTRACT

A device for testing a data carrying service operating over a telecommunications line includes a plurality of test circuits. Each test circuit is arranged to determine and test one or more characteristics of a data carrying service and a termination of the telecommunications line is emulated. The operation of each of the plurality of test circuits is controlled, and the telecommunications lines is connected to one or more of the plurality of test circuits. The data carrying service remains connected via a connection during all of the testing operations provided by one or more of the test circuits which enables the device to automatically determine the identity of the data carrying service. The test circuits may be arranged to enable emulation of a termination to be interconnected so as to enable the device to provide a passive link in the data carrying service and/or provide throughput testing of the telecommunications line.

24 Claims, 10 Drawing Sheets

U.S. PATENT DOCUMENTS

| | | | |
|---|---|---|---|
| 5,208,846 A | 5/1993 | Hammond et al. | |
| 5,504,736 A | 4/1996 | Cubbison, Jr. | |
| 6,177,801 B1 * | 1/2001 | Chong | 324/520 |
| 6,417,672 B1 * | 7/2002 | Chong | 324/520 |
| 6,466,650 B1 | 10/2002 | Fischer et al. | |
| 6,516,053 B1 | 2/2003 | Ryan et al. | |
| 6,891,803 B1 * | 5/2005 | Chang et al. | 370/252 |
| 2001/0043675 A1 | 11/2001 | Starr | |
| 2002/0146094 A1 | 10/2002 | Brown | |
| 2003/0048756 A1 * | 3/2003 | Chang et al. | 370/252 |
| 2005/0249332 A1 * | 11/2005 | Chang et al. | 379/22 |

FOREIGN PATENT DOCUMENTS

| | | |
|---|---|---|
| JP | 01-241931 | 9/1989 |
| JP | 11-275203 | 10/1999 |
| JP | 2000-278384 | 10/2000 |
| JP | 2001-231057 | 8/2001 |
| WO | WO 03/005598 A1 | 1/2003 |

OTHER PUBLICATIONS

Japanese Office Action mailed Nov. 11, 2008 re JP 2006-520017 (English translation included).

Chinese Office Action mailed Oct. 10, 2008, re CN 2004-800207660 (English translation included).

\* cited by examiner

TEST DEVICE FOR DATA SERVICES

This application is the US national phase of international application PCT/GB2004/003114 filed 16 Jul. 2004 which designated the U.S. and claims benefit of GB 0316891.1, dated 18 Jul. 2003, the entire content of which is hereby incorporated by reference.

BACKGROUND

Technical Field

The present invention relates to test devices for data carrying services operating over a telecommunications metallic pair. More particularly, but not exclusively, to a device which is able, via a single port, to automatically identify and confirm the correct operation of one of a number of data services, including ISDN (bri) (Integrated Services Digital Network Basic Rate Interface), ADSL (Asymmetric Digital Subscriber Line), ShDSL (Single pair High bit rate Digital Subscriber Line) and POTS (Plain Old Telephony Service).

In the communications field, an ever increasing range of technologies means that there are increasing requirements for apparatus which is able to test and monitor the provision of different data carrying services (ISDN, ADSL, etc) which may run over telecommunications lines. A multitude of products are available on the market including a number of hand held devices with which a user is able to test the operation of individual services.

Prior art apparatus include, for example the Aurora Tango from Trend Communications Ltd (http://www.trendcomms.com). This is modular apparatus, which allows testing of a plurality of different services including ShDSL, ADSL and ISDN. The apparatus comprising a plurality of detachable modules, each for testing one of the services. The modules may be swapped as appropriate to test for a different service, thereby offering a flexible testing apparatus. However, although this arrangement offers a highly flexible solution, it also requires a high level of understanding and operator skill. In order for the device to function correctly, it is critical that the correct port of the tester is connected to the correct type of service.

In addition it is advantageous to be able to simulate an extended length of line, for example, a line pair such as a copper pair. This enables, for example, the attenuation over the length of line to be determined testing a service. For example, when used for testing in an Asynchronous Digital Subscriber Line ADSL service environment this can be used to confirm when testing the central office that the Digital Subscriber Line Access Multiplexer (also known as a Digital Subscriber Loop Access Multiplier) DSLAM card is capable of communication over a standard line length rather than the actual line length which is present. By simulating a longer length of wire in this way and thereby putting the DSLAM card under stress it is possible to identify additional problems not usually identified, as the circuit would normally appear to conform to the standard of service.

An additional use of this device is to simulate the actual insertion loss on a customer line by utilising the line attenuator in conjunction with the Multi Service Tester and the end user's own CPE. By this method, the connection between the end user's CPE and the telephone exchange can be simulated to the same load level as the actual customer line. This can be achieved from the customer's premises without the need for a visit to the telephone exchange.

BRIEF SUMMARY

Known methods for simulating different lengths of cable involve the connection of additional pieces of equipment. Typically, an engineer will connect a cable drum (i.e. rolled length of actual cable) to the relevant part of the line, to thereby put the circuit under load. However, from a safety point of view this is not an optimum procedure because excessive lengths of cable must be carried around. In addition, such testing procedures produce non-standard results because the different cable lengths used by different engineers will produce different losses.

The present invention seeks to provide an improved test apparatus for testing data carrying services operating over telecommunications line (by line here is meant a single twisted metallic pair, although in the case of ISDN S-bus the service is over two metallic pairs).

According to a first aspect of the present invention, there is provided a device for testing a data carrying service operating over a telecommunications line, the device comprising:
  a plurality of test circuits, each test circuit arranged to determine and test one or more characteristics of a data carrying service and providing means to emulate a termination of said telecommunication line;
  processing means operable to control the operation of each of said plurality of test circuits; and
  connection means arranged to connect said telecommunication line to one or more of said plurality of test circuits, wherein said data carrying service remains connected to said connection means during all of the testing operations provided by said one or more of the test circuits.

Preferably, said connection means connects said data carrying service telecommunications line to one test circuit at a time; said processing means is operable to control the operation of a plurality of said test circuits in a predetermined sequence; and said data carrying service remains connected to said connection means as each of said plurality of test circuits is operable in said predetermined sequence.

Alternatively, said means for said connection means to provide input to a plurality of test circuits at a time, and said processing means is operable to control the parallel operation of said plurality of said test circuits; and said data carrying service remains connected to said connection means as each of said plurality of test circuits is operable.

The processing means may control the operation of said test circuits to determine the identity of the data carrying service.

The device may comprise a display means arranged to provide an indication of the identity of the data carrying service determined by said processing means and one or more of said test circuits to an operator of the device.

The connection means may be arranged to both send and receive data over said line.

The connection means may be connected to said means to emulate a termination point of said telecommunications line.

The connection means may comprise a pair of ports, each port arranged to connect to said telecommunications line to said means to emulate a termination point of said telecommunications line, the test circuit being arranged to enable the device in use to act as a passive link within the data carrying service.

The connection means may comprise a pair of ports, each port arranged to connect to said telecommunications line to a said means to emulate a termination point of said telecommunications line, the test circuit being arranged perform throughput testing of said data carrying service over said line.

The means to emulate a termination of said telecommunications line may comprise a modem. Alternatively, it may comprise a field programmable gate array and digital signal processor arrangement.

The termination of said telecommunications line may comprise termination at a transceiver unit central office. The termination of said telecommunications line may comprise termination at a transceiver unit remote terminal.

A second aspect of the invention comprises a device for identifying and testing data carrying services operating over a telecommunications line, the device comprising:
  a port for connection to the line so as to send and receive data;
  a processing unit; and
  test circuit means capable of identifying and testing in co-operation with the processing unit a plurality of different data carrying services using the data sent and received via said input port.

Preferably, the plurality of different data carrying services comprise any combination of DSL (Digital Subscriber Line), ISDN (Integrated Services Digital Network), and POTS (Plain Old Telephony Service) services.

Preferably, the test circuit means can operate as a plurality of different modem types under control of the processing unit.

Preferably, the test circuit means comprises a plurality of modem chip sets including two ADSL (Asymmetric Digital Subscriber Line) chip sets and two ShDSL (Single pair High bit rate Digital Subscriber Line) chip sets.

Preferably, the test circuit means comprises a programmable modem chip set which can be programmed under control of the processing unit to operate as a plurality of different modem types.

Preferably, the processing unit is arranged to control the order of identifying and testing the plurality of data carrying services in accordance with a predefined script.

A third aspect of the invention comprises a device for testing a data carrying service operating over a telecommunications line between a first and second terminal, the device comprising:
  a first port for connecting to the first terminal on the line so as to send and receive data from the first terminal;
  a second port for connecting to the second terminal on the line so as to send and receive data from the second terminal;
  a processing unit; and
  test circuit means capable of testing in co-operation with the processing unit at least one data carrying service using the data sent and received via said ports, the test circuit means comprising two chip sets interconnected such that data received via one of said ports may be output substantially unchanged via the other of said ports.

Preferably, testing a data carrying service comprises monitoring the data received via said ports.

Preferably, testing a data carrying service comprises introducing errors into the data received via one of said ports before outputting it via the other of said ports.

A fourth aspect of the invention comprises a device for testing a data carrying service operating over a telecommunications line, the device comprising:
  a port for connection to the line so as to send and receive data;
  a line attenuation emulator for modifying the data in a manner to emulate an extended length of line;
  a processing unit; and
  test circuit means for testing in co-operation with the processing unit a data carrying service using the data sent and received via said input port.

Preferably, the attenuation emulator is provided by an interface unit comprising attenuation circuitry, the interface unit connected between the port and the test circuit means.

A fifth aspect of the invention comprises a method of identifying a data carrying service operating over a telecommunications line using a device according to any preceding claim, the method comprising:
  connecting said telecommunication line to connection means provided by said device and arranged to connect said telecommunication line to one or more of a plurality of test circuits provided by said device, each test circuit arranged to determine one or more characteristics of a data carrying service and providing means to emulate a termination of said telecommunication line;
  determining, using processing means operable to control the operation of each of said plurality of test circuits, the identity of the data carrying service,
  wherein said data carrying service remains connected to one or more of the test circuits via said connection means during the independent operation of each test circuit.

Preferably, said device has display means, and the method further comprising the step of:
  displaying the identity of the data carrying service determined by said device on said display means.

Advantageously, the invention is able to identify and test a plurality of different data carrying services via only a single connection port. Advantageously, an automatic test procedure can be performed by the device, which will be connected in a consistent way to the line irrespective of which service is being carried over the line. Since there is no requirement to connect to different ports for different services, the device can be operated by a less-skilled engineer than would otherwise be required. They do not require information in advance as to which service type to test for, and a time saving can be made since it is not necessary to disconnect and reconnect a large number of different devices. The services which can be tested for may include, for example, any combination from Asymmetric Digital Subscriber Lines (ADSL), Integrated Services Digital Network Basic Rate Interface (ISDN bri), Single pair High bit rate Digital Subscriber Lines (ShDSL) and POTS (Plain Old Telephony Service).

Advantageously, the invention is able to perform throughput testing, to monitor the performance of a circuit and of the data passing through it. This allows the device to test that the operation and data rates are as expected. The processor may be further arranged to introduce errors into the service data before it is output from the device. This allows the device to check that the error-reporting procedures in the service are functioning correctly.

Advantageously, the invention is therefore able to simulate an extended length of line so as to test that the service is operating correctly over a full range. Advantageously, such in-built attenuation circuitry provides for ease and convenience of use.

The various aspects of the invention may be appropriately combined in any suitable combination apparent to those skilled in the art with each other and with any of the features of the invention set out above and by the dependent claims.

BRIEF DESCRIPTION OF THE DRAWINGS

Specific embodiments according to the invention will now be described by way of example, with reference to the accompanying drawings, in which.

DETAILED DESCRIPTION OF EXEMPLARY EMBODIMENTS

Figure 1:
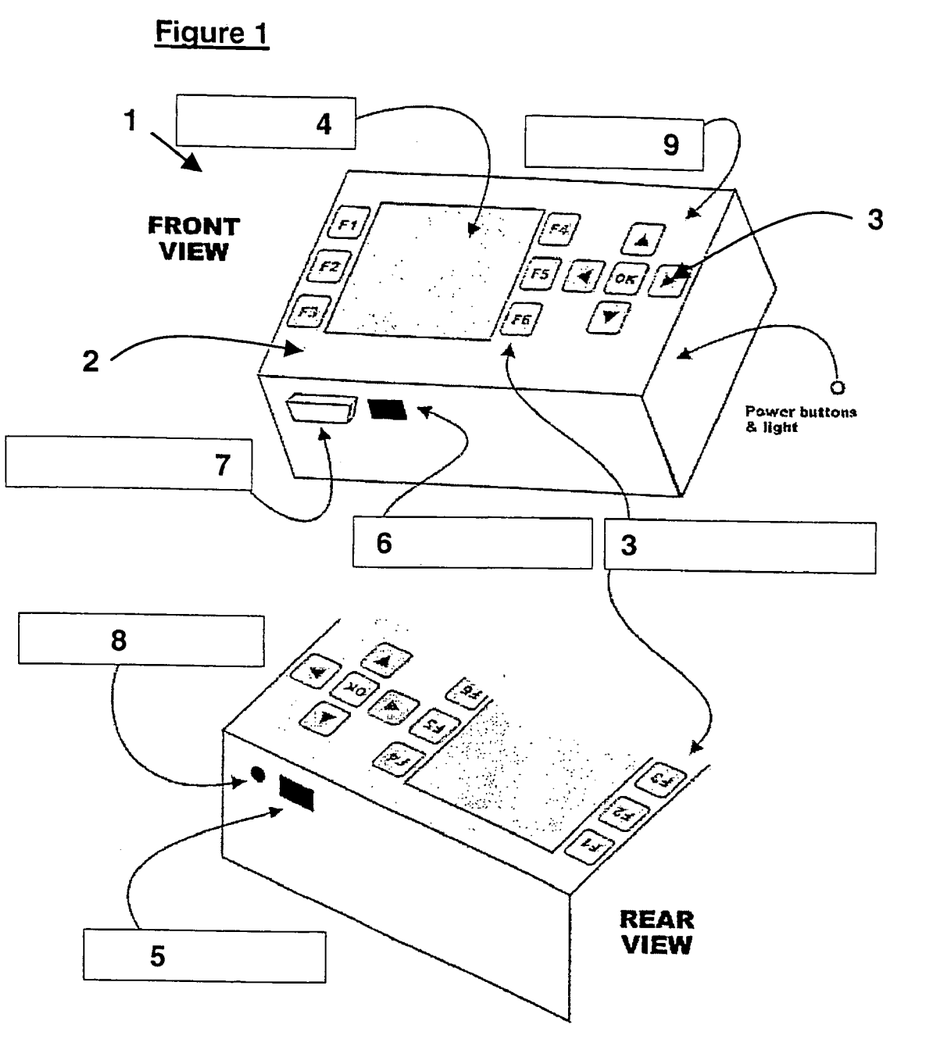
FIG. 1 shows a test device according to an embodiment of the present invention.

FIG. 1 shows a test device 1 according to a first embodiment of the present invention. Test device 1 comprises a weatherproof housing 2, a plurality of user-operable keys 3 on an in-built key pad 9 in the housing, and a liquid crystal display 4. Two connection sockets 5 and 6 are provided. These connection sockets 5, 6 are of a type enabling a number of different devices to be connected either directly or using adapters, for example such a RJ45 connection sockets. Also provided is a standard 9-pin female connection socket 7, and a charge point socket 8. Internally, the device comprises a power supply, and an internal circuitry architecture which is described with reference to FIG. 2. The device is designed to be small and light enough such that it is easily carried by a user with one hand.

Figure 2:
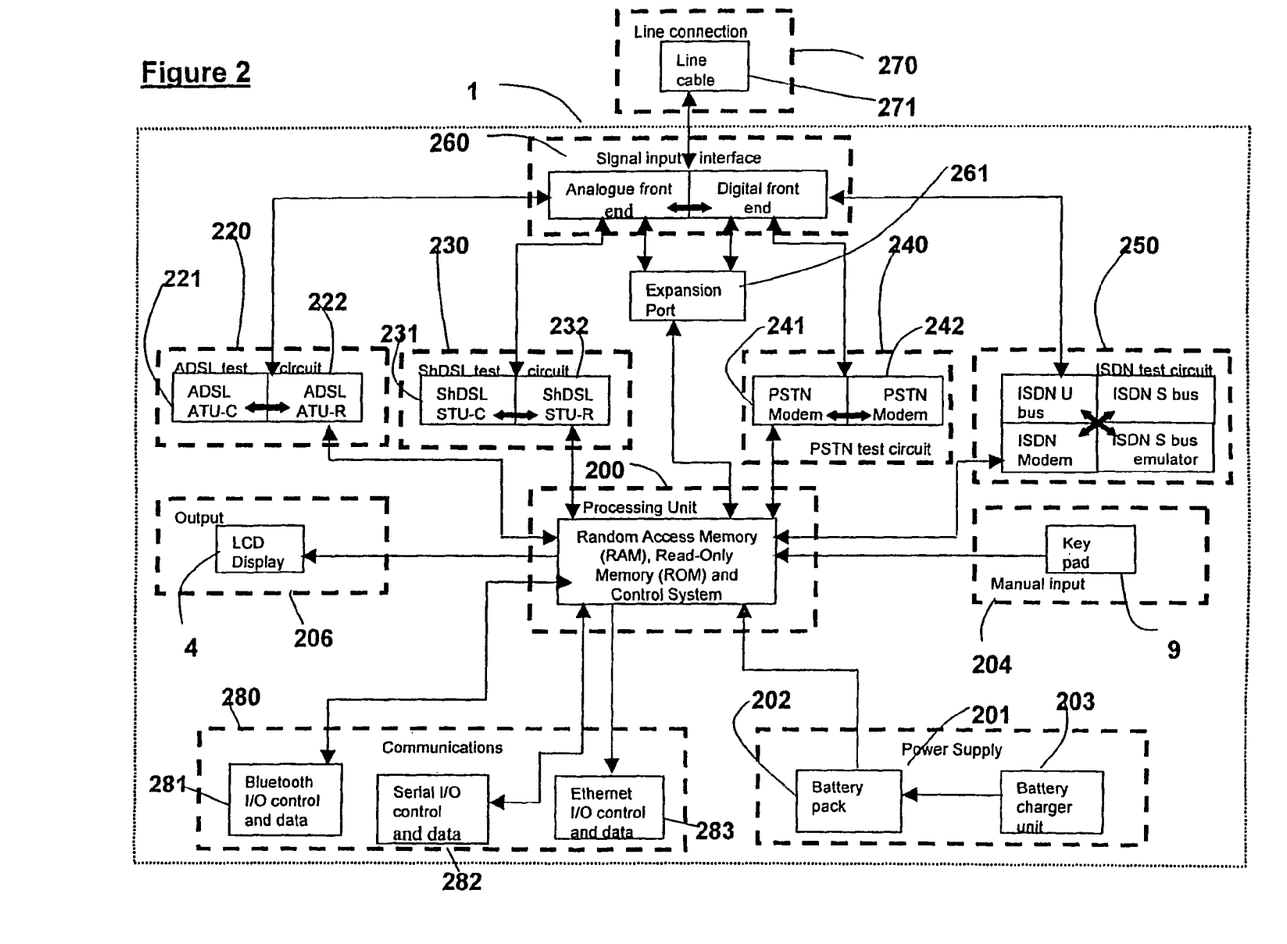
FIG. 2 shows the architecture of the device in FIG. 1.

The operation of the device 1 will now be described with reference to the subsequent Figures. The internal architecture is illustrated in FIG. 2. Data communication between the device 1 and the telecommunications line occurs via signal input interface 260. The operator must first physically connect the device to the telecommunications line via line connection 270. Line cable 271 is used for this, one end of which is connected into the device 1 via the RJ45 socket 5. The use of a single standardised socket connection, such as RJ45, is advantageous in that it allows the device to be connected to many different services world-wide. All that is required is the use of various adapter cables to complete the line connection 270 according to the local requirements.

Test device 1 is controlled by a central processing unit (CPU) 200. This is provided, in the embodiment, by a dedicated central processing unit designed with low power requirements for mobile computing, such as the INTEL Centrino. In addition, it includes built in wireless local access network capabilities (WiFi LAN).

Under control of the CPU, test device 1 has the ability to identify and test a plurality of different data carrying services which might be present on the telecommunications line. To perform this, a plurality of test circuits 220, 230, 240, 250 are provided. ADSL test circuit 220 comprises two modem chip sets 221 and 222, independently controllable and able to emulate both ATU-C and ATU-R. ShDSL test circuit 230 comprises two modem chip sets 231 and 232 for emulating STU-C and STU-R. Also provided is PSTN test circuit 240 comprising two PSTN modems 241 and 242, such as two dial-up V.92 modems, and an ISDN test circuit 250.

When the test device 1 is connected to a metallic pair, and switched on, it steps through a sequence of tests using the relevant test circuits, so as to identify the type of service present. Information is presented to the operator (user) via an appropriate output 206, which in the embodiment is a backlit liquid crystal display 4 (such as the type which might be found in a mobile telephone) connected to the CPU. The presentation of information to the operator at appropriate stages allows the results of various tests to be displayed, and requests for further instructions/confirmation to be presented. The device is arranged to advise the user of any connection steps that are required, and will advise the user of any mistakes. The operator is able to interact with the device 1 via input 204, which in the embodiment is a built in keypad 9 connected to the CPU. Thus the operator is able to send instructions to the device, and view test results/error messages, etc. In the event that the device is unable to identify a service/fault then a highly-skilled operator may specify individual tests which may be run in order to pin-point the problem.

The arrangement of the device allows it to mimic the correct modem termination for each of a plurality of services (for example, it may emulate an ATU-C and ATU-R or STU-C and STU-R when required). It is able to check for the presence of a large number of data carrying services, including ISDN (bri on either the U or S bus), ADSL, ShDSL and POTS dialup via the same connection socket, without the need to disconnect/reconnect the device.

An expansion port 261 is also provided, connected to the signal input interface 260. This allows the addition of future modems or other connectivity while still using the same connection port to connect to the line.

The power supply 201 in the embodiment is provided by a rechargeable battery pack 202, comprising for example, standard Nickel metal hydride batteries capable of powering the unit for a minimum of 120 minutes. The device is arranged to warn the user of an impending power failure at 30, 15, 5 and 1 minutes, and if the power fails, then the unit will fail gracefully without using data. Recharging is performed via charging circuit 203 connected to charge point socket 8 on the exterior of the device. Alternatively, the device may be powered for longer periods using mains electricity or external battery supply.

Figure 7:
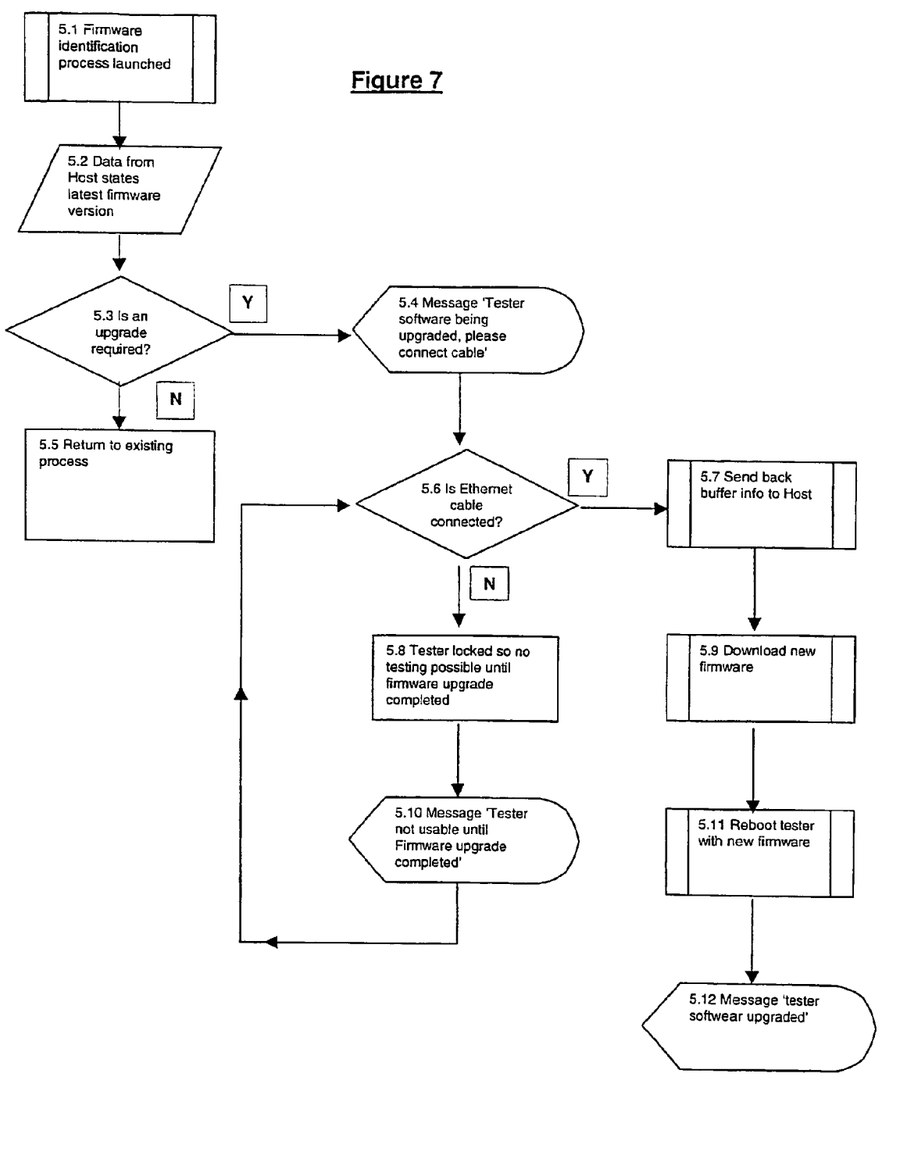
FIG. 7 is a flow chart showing the process of upgrading the firmware of the device of FIG. 1.
Figure 8:
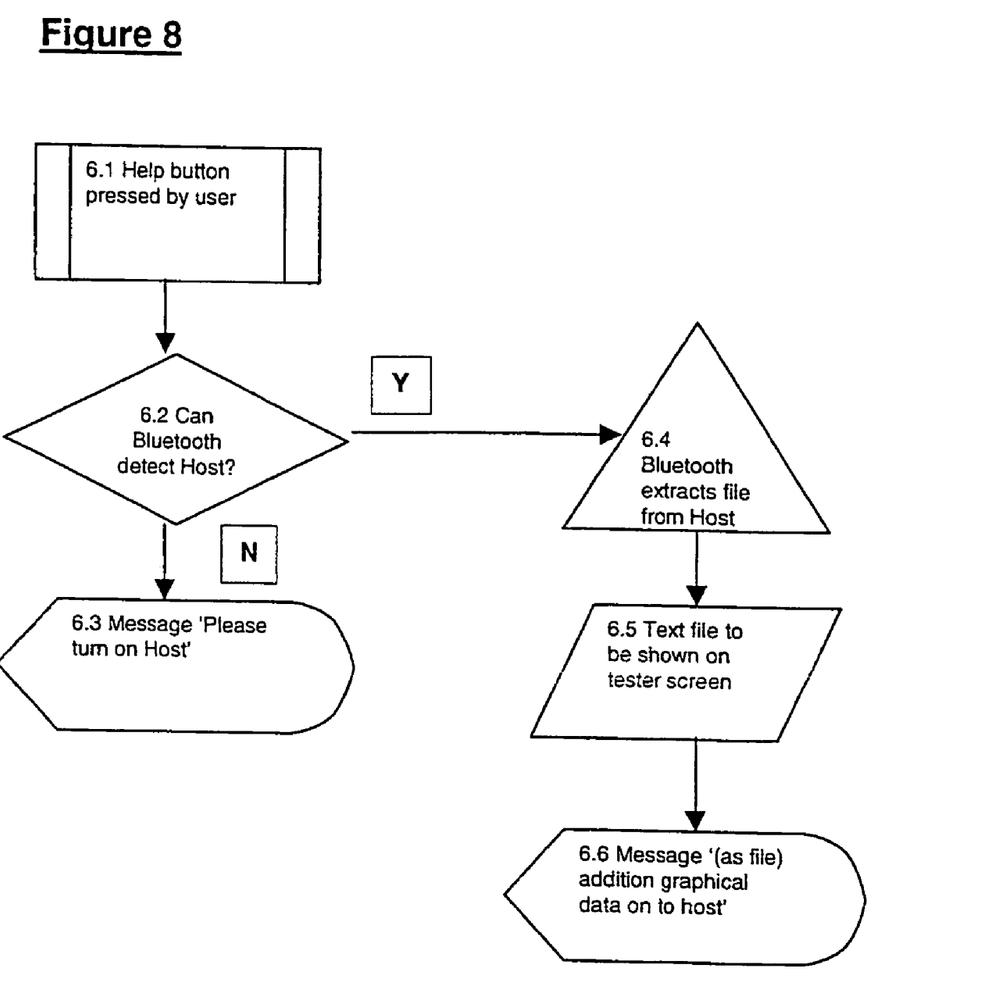
FIG. 8 is a flow chart showing the operation of the device when interacting with a secondary device to obtain additional information requested by a user.

Communication with the device, as already discussed, is possible directly by the operator using the keypad 9. In addition, the test device 1 is provided with further communication capabilities 280, including via Bluetooth 281, serial 282 or Ethernet connection 283. For example, the Bluetooth capabilities allow for wireless upload/download of information, and interaction with other Bluetooth enabled devices as part of the test procedures. Furthermore, the communication capabilities of the device allow for control of the device via an external host, and the combining of additional line test information from RS232/Bluetooth devices to assist in complex fault identification (see FIG. 5). In addition, the device allows for the addition of future services by the upgrade of firmware (see FIG. 7).

Figure 3:
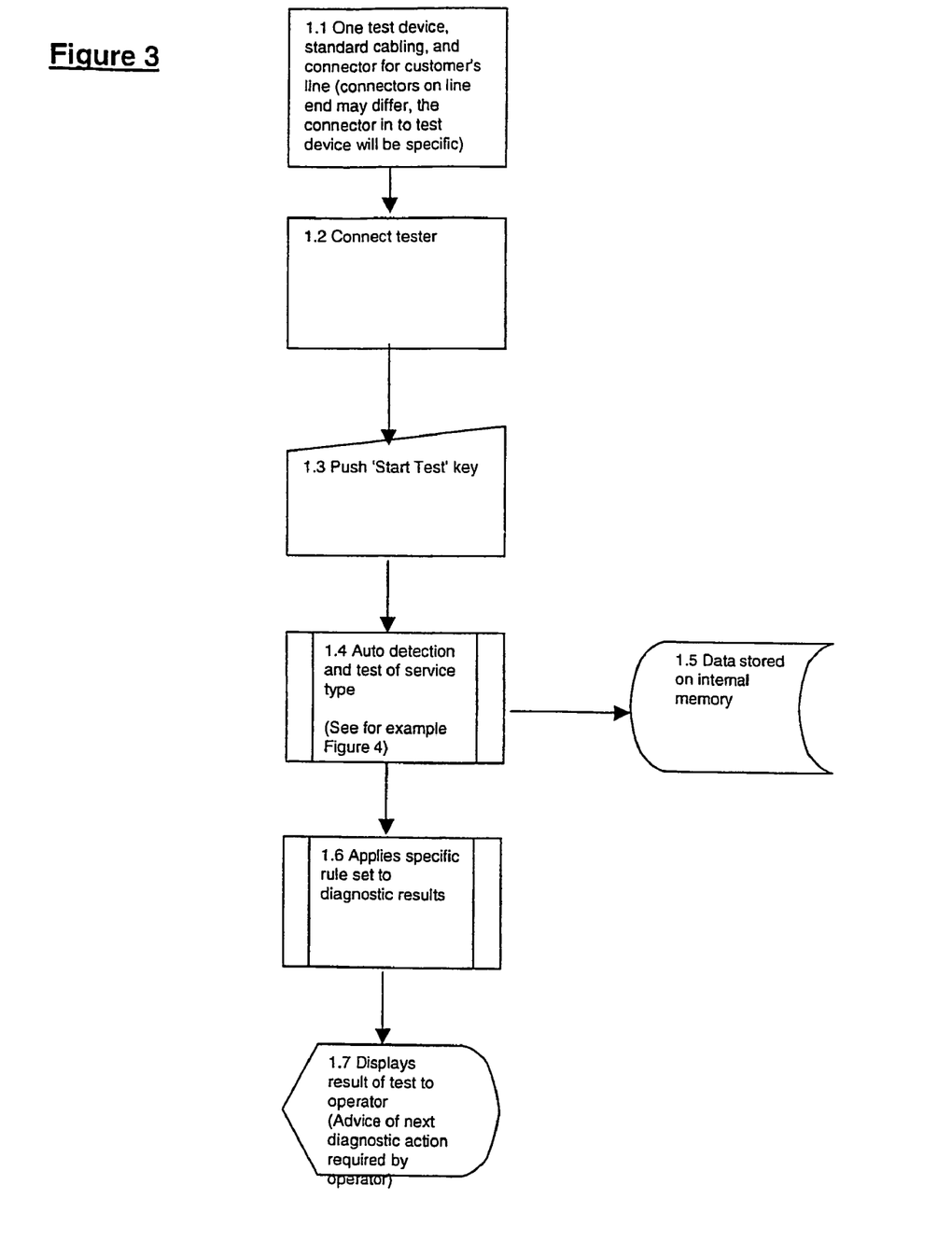
FIG. 3 is a flow chart showing a summary of the test process performed using the device of FIG. 1.

The typical operation of the device shown in summary in FIG. 3. The operator (user) is provided (step 1.1) with a test device 1, plus cabling for connecting to the test line. One end of the cabling is provided with a standard connector (e.g. RJ45) for plugging into the test device, the other end being whatever connector is appropriate for the situation. The test device is connected (step 1.2) to the line, and switched on (step 1.3) and the "Start Test" key pressed by the operator. The device then automatically steps through a sequence of pre-defined tests (step 1.4) which will allow it to identify the type of service present, and data is recorded (step 1.5) by the device on an internal memory provided in the processing unit 200. The device then processes the data (step 1.6) following a pre-programmed rule set in order to diagnose the results. The results are displayed to the operator (step 1.7) via the LCD display 4.

Figure 4:
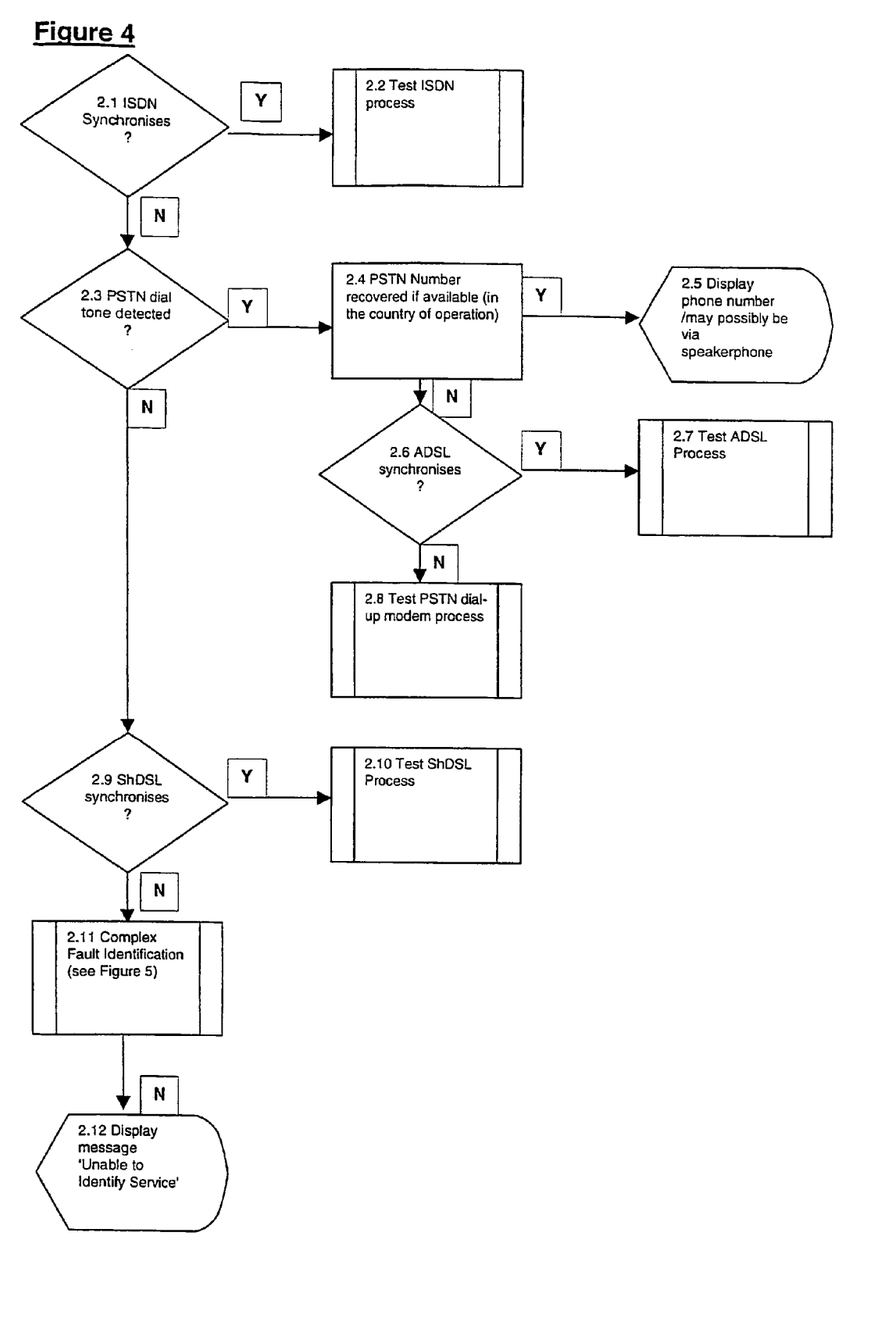
FIG. 4 is a flow chart showing in more detail a portion (the automatic service identification and test procedure) of the process shown in FIG. 3.

FIG. 4 is a flowchart showing the procedure performed during step 1.4, for automatically identifying and testing the service type. The device is pre-programmed with the sequence of steps to run through to identify and then to test the operation of a number of services. The first service checked for is ISDN (bri). Initially, the device checks (step 2.1) whether ISDN synchronises, and if so then the ISDN test process is performed (step 2.2) to confirm it is operating correctly.

Alternatively, if ISDN 2 (BRI) is not detected then the PSTN service is checked for. For this, the device checks (step 2.3) whether there is a PSTN dial tone. If so, and the PSTN number can be recovered (step 2.4) then this is displayed to the operator (step 2.5). However, if the PSTN service is available but the PSTN number is not recovered then the device checks (step 2.6) whether ADSL synchronises. If yes, the system runs through the ADSL test process (step 2.7). If the ADSL does not synchronise at step 2.6 then the device runs through the PSTN dial up modem test process (step 2.8).

However, if at step 2.3, PSTN service is not available, then the device checks for the presence of ShDSL (step 2.9). If this is available, the device performs the ShDSL test process (step 2.10).

The reason for this sequence of tests is due to the higher voltage levels with the ISDN2 (bri) service. The sequence enables the other test circuits 220, 230, 240 to be isolated during the test so as to avoid unintentional damage. In addition, ISDN2 (bri) is the quickest service to be identified, due to the speed of its synchronisation with the central office equipment. ShDSL service is the last to be tested for as it does not rely on the conventional dial tone being present. Instead, with DC wetting (a direct current applied to the line, e.g. to signify the metallic pair is in use or to keep induced noise down) it is the only service which could be available.

A further aspect of the device is that it is able to perform throughput testing, i.e. it is able to act as a passive link within the data carrying service, allowing the data to flow normally and unimpeded (at true upstream/downstream data rates, either as a function of an ATM cell count or bytes per second), while continuously monitoring the service to check it is functioning correctly. To operate in this mode, the device may be connected, for example, via sockets 5 and 6 between the customer premises equipment at one end and the central office equipment at the other.

The ability of the test device to perform throughput testing is due to the dual-modem arrangement in the test circuits. More specifically, the two modem chip sets 221 and 222 have links between them to allow the connections which will permit throughput testing. Similarly, in the ShDSL test circuit, the two modem chip sets 231 and 232 are provided with links between them to enable throughput testing. In addition, the device is able to inject errored cells into the data so as to test whether the error reporting in the service is functioning correctly.

While dual-modem test circuits are already known in the prior art, they are not used for throughput testing. For example, known test devices include Veratas 992 ECR, available from Aware, Inc., Massachusetts (http://www.aware.com), a development system for DSL to assist developers to build and test ADSL based products and services.

This DSL network test system is a dual modem test box in which each modem can emulate either an ADSL transceiver unit central office (ATU-C) or an ADSL transceiver unit remote terminal (ATU-R). In this manner, the system is able to mimic either central office or customer premises equipment, but the modems are not connected to test for throughput.

A further aspect of the device is that it has the capability to emulate different lengths of line, e.g., different lengths of a metallic pair or cable, for testing purposes. This functionality is provided by in-built attenuation circuitry (including for example an appropriate resistor array) provided as part of the Signal Input Interface 260. This operates as an attenuation emulator, which can emulate a length of line, such as a metallic pair (e.g., copper cable), so as to mimics the losses (in dB, decibels) that can occur over the emulated length. To enable a fair evaluation of the circuit under test, this should be able to emulate for example a selection of 0.5 mm copper cable lengths in the range of 1 kilometer to 7 kilometers. When working in PSTN and ISDN mode the attenuation emulator should allow the circuit under test to still work as normal (i.e. it restricts the frequency response of the line but not the line voltage).

The attenuation emulator incorporated into the device allows the operator to test, for example, that the DSLAM is capable of communication over a standard line length instead of the actual line length that is present. This ensures rigorous testing of the circuit under different conditions to ensure correct operation of the service. With regard to the customer end, it is useful to prove the reliability of the line pairs, i.e. that they are able to maintain a correct level of service. In this way, it is possible to limit the early failure of a line pair, e.g., a copper pair, on provision or restoration of service.

One further aspect of the device is that one of the RJ45 connection sockets 6 is provided with a non-standard offset tag. This identifies the one socket 6 from the other RJ45 socket 5 for the purposes of the operator, and is to ensure they plug into the correct connection socket when using the device.

Figure 5:
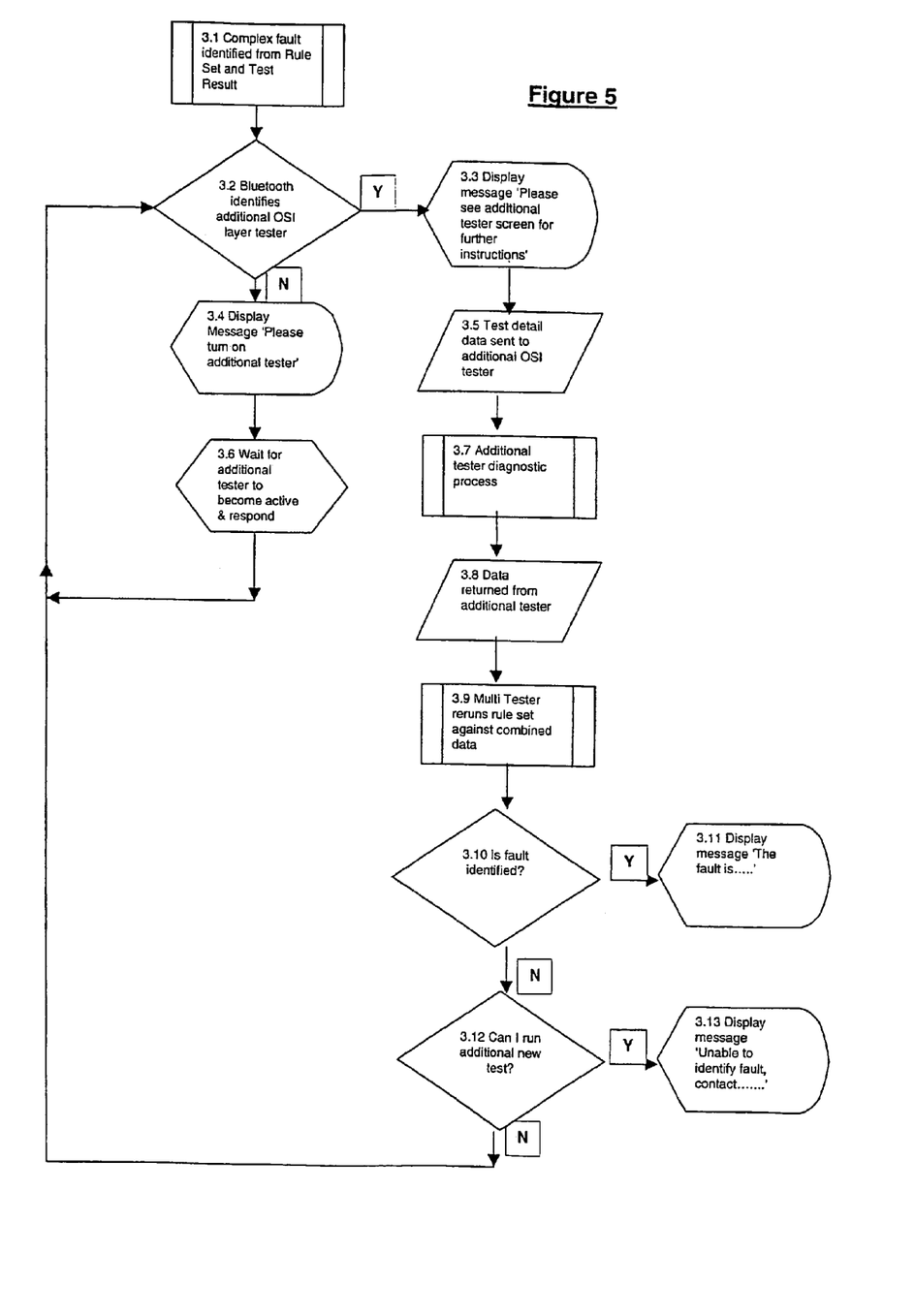
FIG. 5 is a flow chart showing in more detail a portion (the complex fault identification procedure) of the process shown in FIG. 3.

FIG. 5 indicates in more detail the complex fault identification procedure which may be carried out by the test device 1. The device checks whether an additional OSI (open systems interconnection) layer tester can be identified via Bluetooth (step 3.2). If no additional tester is identified then the device indicates to the operator that they should turn on the additional tester, for example by (step 3.4) displaying the message "please turn on additional tester" in the LCD display 4. The device then waits (step 3.6) for the additional tester to respond.

When the test device identifies an additional tester, the operator may be directed to the additional tester (step 3.3) for additional instructions. Details of the relevant test data are sent (3.5) to the additional tester. The additional tester performs further diagnostic test processes on the data (step 3.7), and the results are returned (step 3.8) to the test device. This re-runs the revised data set through its pre-programmed rule set (step 3.9) to identify the fault (step 3.10). If successful, the results are indicated to the operator (step 3.11) by a message on the LCD display 4. Alternatively, if still unsuccessful, test device 1 determines whether any other further tests might be run (step 3.12) and displays the appropriate messages to the operator (step 3.13).

After completion of the testing procedure, the results of output 2 the operator via the display. The operator is then asked to confirm whether the type of service is that which they expected. For example, if the test device was unable to identify (since step 2.6) ADSL service, but did verify dial tone (step 2.8) then the operator is asked to confirm that the expected service was POTS dial up only. However, if the operator here indicates that the service should actually have been ADSL, then the processing unit will perform further testing according to its predefined rule set in order to a certain weather DSL Connectivity could be established on the transport layer.

Figure 6A:
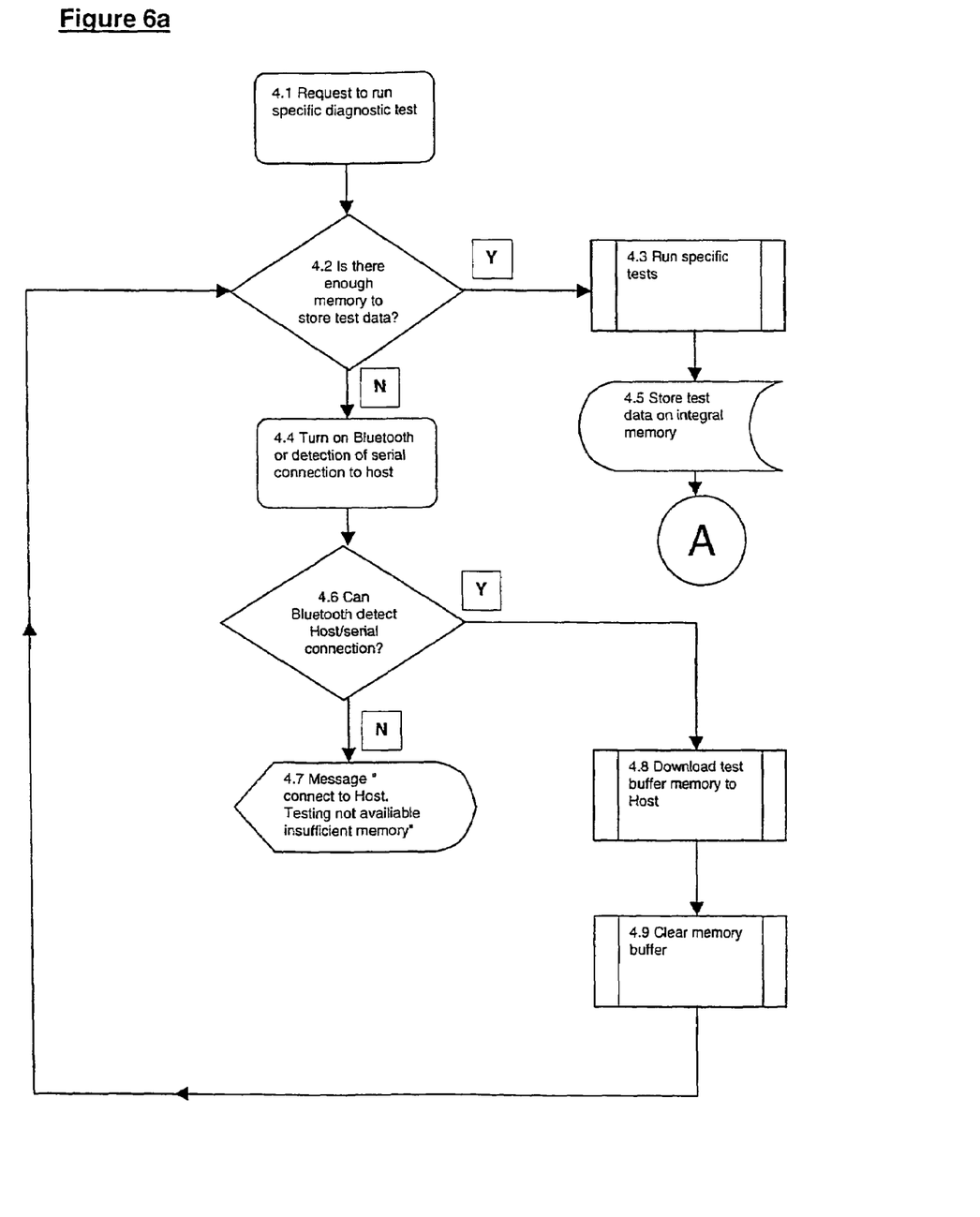
FIGS. 6a and 6b are flow charts showing the processes performed during the operation of the device of FIG. 1 to store test data.
Figure 6B:
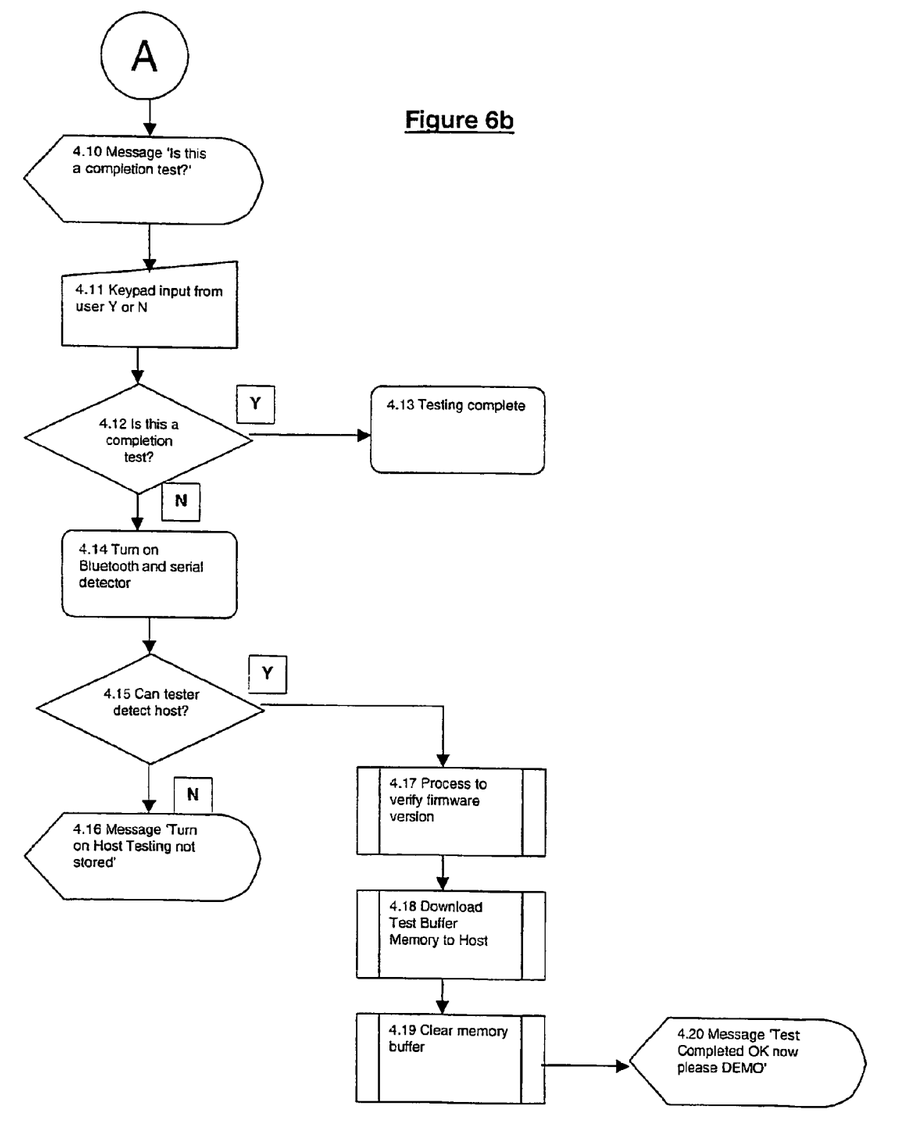

FIGS. 6a and 6b are flow charts showing how the test device manages its data storage during testing. Upon a request to run a specific diagnostic test (step 4.1), the device checks whether (step 4.2) there is sufficient internal memory to store the test data. If yes, then the test can be performed (step 4.3) and the relevant data stored internally (step 4.5) however, the test device also has an option to download data to an external device if step 4.2 determines that there is insufficient memory to store the test data. In this case, the test device will search (step 4.4) for either a Bluetooth or serial connection to a host (external device). If (at step 4.6) the external device cannot be detected, then the vesting procedure must terminate due to insufficient memory (step 4.7). However, in the event that the test device is able to successfully communicate with the host (step 4.8) then the test of a memory may be downloaded to the host and then cleared (step 4.9).

After the test device had performed the tests and stored the data to an internal memory (step 4.5) then the device will enquiry (step 4.10) whether the testing is complete. Upon receiving the appropriate input from the operator via the key pad (step 4.11), the device will determine whether testing is indeed complete (step 4.13) or else whether the operator wishes to download all the test device results for central storage. If so, the device checks (step 4.14) for a Bluetooth or serial connection to a host. If this is unsuccessful, the device informs the operator (step 4.16) to turn on the host because the testing has not been stored successfully. However, if (at step 4.15) a host is successfully detected and the firmware version verified (step 4.17) then the test of the memory is downloaded (step 4.18) to the host and then cleared (step 4.19). An indication of this successful procedure (step 4.20) is provided to the operator.

Where required, the tester can be left attached to the line for up to 72 hours, to monitor the connection, and the results will be stored in the device for later analysis.

Figure 9:
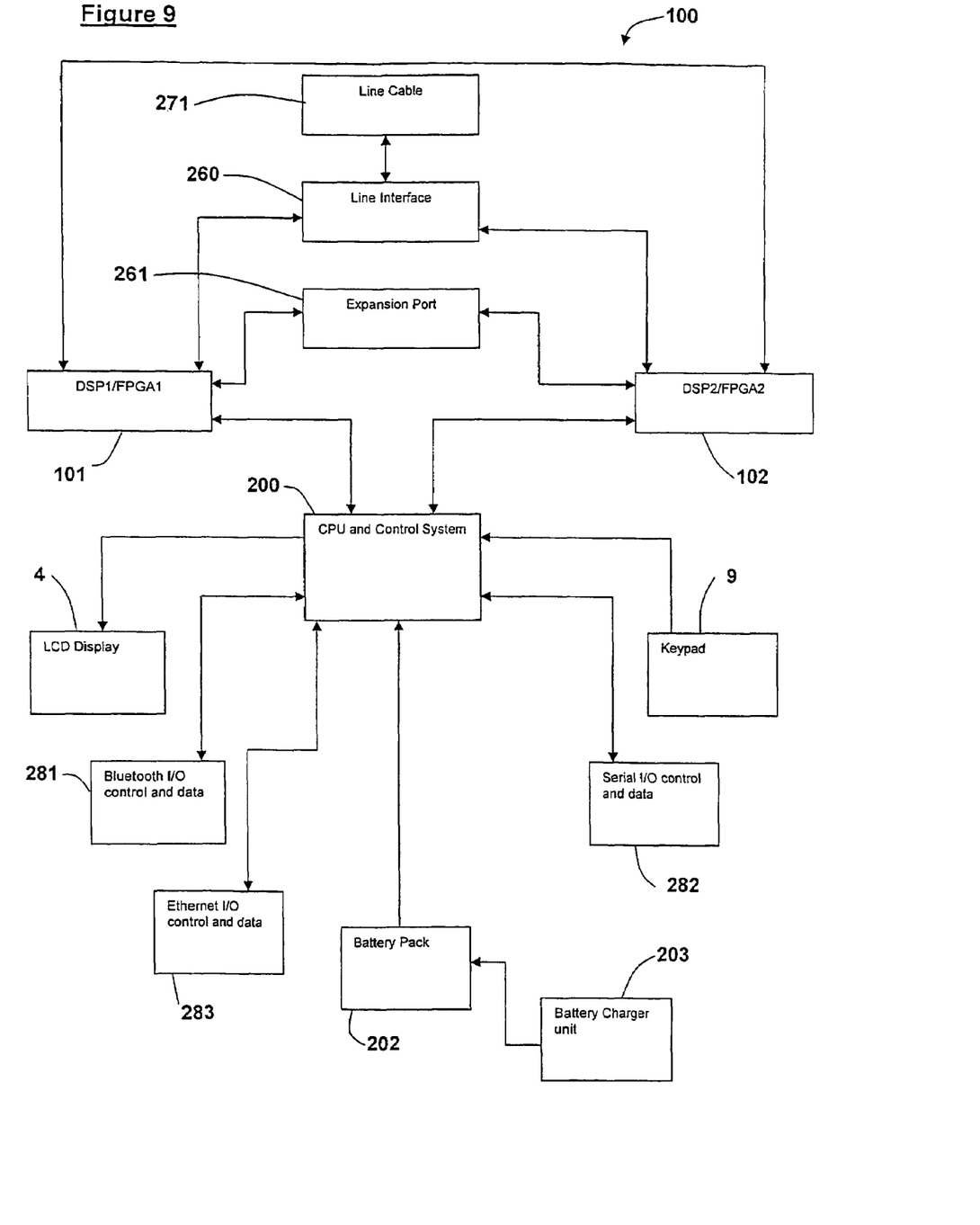
FIG. 9 shows a test device according to a second embodiment of the invention.

A second embodiment of a test device 100 according to the invention is shown in FIG. 9. The architecture is very similar in layout to that of the first embodiment illustrated in FIG. 2. However, the PSTN, ADSL and ShDSL modems, and ISDN modem have instead been replaced by the use of a field programmable gate arrays (FPGA) and digital signal processors (DSP). The use of such chip sets means that only two FPGA/DSP 101 and 102 are required. This is because the firmware needed to make them either a PSTN, a DSL, ShDSL or ISDL modem would instead be held in the memory (ROM) of the device and loaded into the chips as and when required as each circuit test takes place.

The invention thus provides a test device comprising apparatus which enables the type of service to be tested to be automatically identified prior to commencing the test procedure. The type of service is automatically identified by performing a sequence of tests using the relevant test circuits of the test device. The test device comprises a plurality of circuits which mimic modem terminations all on the same connection socket 5,6 without needing to disconnect/reconnect the tested link to the connection socket between the tests for different services. By establishing a passive link using the dual modem arrangement provided by sockets 5,6 throughput testing can be performed in which the throughput data flow is unimpeded while the device performs the various test functions.

While the embodiments described hereinabove describe test circuits which are sequentially used to determine the identity of the data carrying service, those skilled in the art will appreciate that it is possible to receive a data service via a port 5,6 which is subsequently split into a plurality of data streams which are processed in parallel by a plurality of test circuits in an alternative embodiment of the invention.

What is claimed is:

1. A device for testing a data carrying service operating over a telecommunications line, the device comprising:
   a plurality of test circuits, each test circuit arranged to determine and test one or more characteristics of a data carrying service and providing a termination emulator to emulate a termination of said telecommunications line;
   a processor operable to control the operation of each of said plurality of test circuits; and
   at least one connector arranged to connect said telecommunications line to one or more of said plurality of test circuits,
   wherein said test circuits are arranged to enable said data carrying service to remain connected to said at least one connector during all of the testing operations provided by said one or more of the test circuits;
   said at least one connector connects said data carrying service telecommunications line to one test circuit at a time;
   said processor is operable to control the operation of a plurality of said test circuits in a predetermined sequence; and
   said data carrying service remains connected to each said connector as each of said plurality of test circuits is operable in said predetermined sequence.

2. A device according to claim 1, wherein
   said processor controls the operation of said test circuits to determine the identity of the data carrying service.

3. A device according to claim 2, further comprising a display arranged to provide an indication of the identity of the data carrying service determined by said processor and one or more of said test circuits to an operator of the device.

4. A device according to claim 1, wherein each said connector is arranged to both send and receive data over said telecommunications line.

5. A device according to claim 1, wherein each said connector is connected to said emulator to emulate a termination of said telecommunications line.

6. A device according to claim 5, wherein said at least one connector comprises a pair of ports, each port arranged to connect to said telecommunications line to a chip-set emulating a termination of said telecommunications line, the test circuit being arranged to enable the device in use to act as a passive link within the data carrying service.

7. A device according to claim 5, wherein said at least one connector comprises a pair of ports, each port arranged to connect to said telecommunications line to a chip-set providing means to emulate a termination of said telecommunications line, the test circuit being arranged to perform throughput testing of said data carrying service over said telecommunications line.

8. A device according to claim 1, wherein said emulator comprises a modem.

9. A device according to claim 1, wherein said termination of said telecommunications line comprises a termination at a transceiver unit central office.

10. A device according to claim 1, wherein said termination of said telecommunications line comprises a termination at a transceiver unit remote terminal.

11. A device for testing a data carrying service operating over a telecommunications line, the device comprising:
a plurality of test circuits, each test circuit arranged to determine and test one or more characteristics of a data carrying service and providing a termination emulator to emulate a termination of said telecommunications line;
a processor operable to control the operation of each of said plurality of test circuits;
one or more connectors arranged to connect said telecommunications line to one or more of said plurality of test circuits; and
said at least one connector providing input to a plurality of test circuits at a time, wherein said test circuits are arranged to enable said data carrying service to remain connected to said at least one connector during all of the testing operations provided by said at least one of the test circuit;
said processor is operable to control the parallel operation of said plurality of test circuits; and
said data carrying service remains connected to each said connector as each of said plurality of test circuits is operable.

12. A device according to claim 11, wherein said processor controls the operation of said test circuits to determine the identity of the data carrying service.

13. A device according to claim 12, further comprising a display arranged to provide an indication of the identity of the data carrying service determined by processor and one or more of said test circuits to an operator of the device.

14. A device according to claim 11, wherein said one or more connectors are arranged to both send and receive data over said telecommunications line.

15. A device according to claim 11, wherein said one or more connectors are connected to said emulator arranged to emulate a termination of said telecommunications line.

16. A device according to claim 15, wherein said connectors comprise a pair of ports, each port arranged to connect to said telecommunications line to a chip-set emulating a termination of said telecommunications line, the test circuit being arranged to enable the device in use to act as a passive link within the data carrying service.

17. A device according to claim 15, wherein said connectors comprise a pair of ports, each port arranged to connect to said telecommunications line to a chip-set emulating a termination of said telecommunications line, the test circuit being arranged to perform throughput testing of said data carrying service over said telecommunications line.

18. A device according to claim 11, wherein said termination emulator emulating a termination of said telecommunications line comprises a modem.

19. A device according to claim 11, wherein said termination of said telecommunications line comprises termination at a transceiver unit central office.

20. A device according to claim 11, wherein said termination of said telecommunications line comprises termination at a transceiver unit remote terminal.

21. A device for testing a data carrying service operating over a telecommunications line, the device comprising:
a port for connection to the line so as to send and receive data;
a line attenuation emulator for modifying the data in a manner to emulate an extended length of line;
a processor; and
a test circuit for testing in co-operation with the processor a data carrying service using the data sent and received via said input port.

22. A device according to claim 21, in which the attenuation emulator is provided by an interface comprising attenuation circuitry, the interface connected between the port and the test circuit.

23. A method of testing a data carrying service operating over a telecommunications line, the method comprising:
testing a plurality of test circuits, each test circuit arranged to determine and test at least one characteristic of a data carrying service and providing a termination emulator to emulate a termination of said telecommunications line;
controlling the operation of each of said plurality of test circuits;
connecting said telecommunications line to at least one of said plurality of test circuits;
arranging said test circuits to enable said data carrying service to remain connected during all of the testing operations provided by said at least one of the test circuits;
wherein the connecting step comprises connecting said data carrying service telecommunications line to one test circuit at a time;
the controlling step comprises using a processor to control the operation of a plurality of said test circuits in a predetermined sequence; and
said data carrying service remains connected as each of said plurality of test circuits is operable in said predetermined sequence.

24. A method of testing a data carrying service operating over a telecommunications line, the method comprising:
testing a plurality of test circuits, each test circuit arranged to determine and test at least one characteristic of a data carrying service and providing a termination emulator to emulate a termination of said telecommunications line;
controlling the operation of each of said plurality of test circuits;
connecting said telecommunications line to one or more of said plurality of test circuits; and
providing input to a plurality of test circuits at a time;
wherein said test circuits are arranged to enable said data carrying service to remain connected during all of the testing operations provided by one or more of the test circuits;
said processor is operable to control the parallel operation of said plurality of said test circuits; and
said data carrying service remains connected as each of said plurality of test circuits is operable.

* * * * *